(12) United States Patent
Hubner (10) Patent No.: US 10,820,480 B2
(45) Date of Patent: Nov. 3, 2020

(54) EXHAUST SYSTEM FOR AIR PRESSURE SUPPLY SYSTEM OF WORK VEHICLE

(71) Applicant: Deere & Company, Moline, IL (US)

(72) Inventor: Cary S. Hubner, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 276 days.

(21) Appl. No.: 15/874,214

(22) Filed: Jan. 18, 2018

(65) Prior Publication Data

US 2019/0216006 A1    Jul. 18, 2019

(51) Int. Cl.
*A01C 7/04* (2006.01)
*A01C 7/08* (2006.01)
*A01C 21/00* (2006.01)

(52) U.S. Cl.
CPC .............. *A01C 7/042* (2013.01); *A01C 7/046* (2013.01); *A01C 7/082* (2013.01); *A01C 21/00* (2013.01)

(58) Field of Classification Search
CPC ......... A01C 7/042; A01C 7/044; A01C 7/046; A01C 7/081; A01C 7/082; A01C 21/00
See application file for complete search history.

(56) References Cited

U.S. PATENT DOCUMENTS

| | | | |
|---|---|---|---|
| 4,399,757 A * | 8/1983 | Maury | A01C 7/206 111/34 |
| 6,109,193 A * | 8/2000 | Crabb | A01C 7/046 111/185 |
| 6,142,714 A * | 11/2000 | Montag | A01C 15/04 406/109 |
| 6,367,392 B2 * | 4/2002 | Moore | A47B 13/12 108/27 |
| 6,367,396 B1 | 4/2002 | Meyer | |
| 6,718,891 B1 | 4/2004 | Burbage, Jr. et al. | |
| 7,478,603 B2 | 1/2009 | Riewerts et al. | |
| 7,490,565 B2 * | 2/2009 | Holly | A01C 7/044 111/174 |
| 7,971,420 B1 | 7/2011 | Bollin | |
| 9,426,940 B2 | 8/2016 | Connors et al. | |
| 9,699,956 B2 | 7/2017 | Arnold et al. | |
| 9,763,380 B2 | 9/2017 | Hahn et al. | |
| 2010/0282141 A1 | 11/2010 | Wollenhaupt et al. | |
| 2015/0282422 A1 | 10/2015 | Hahn et al. | |

(Continued)

FOREIGN PATENT DOCUMENTS

| | | | | |
|---|---|---|---|---|
| EP | 2147588 A1 * | 1/2010 | | A01C 7/042 |
| FR | 2934111 A1 | 1/2010 | | |

OTHER PUBLICATIONS

Extended European Search Report for application No. 19152389 dated Jun. 13, 2019.

(Continued)

*Primary Examiner* — Alicia Torres
(74) *Attorney, Agent, or Firm* — Klintworth & Rozenblat IP LLP (57) ABSTRACT

A work vehicle includes row units. The row units each include an air pressure device configured to generate a pressure differential for retaining a commodity against a metering element to singulate and meter a commodity. The air pressure device includes an exhaust structure with a passage configured to direct an exhaust substance to the ground as the row unit travels.

14 Claims, 8 Drawing Sheets

(56) References Cited

U.S. PATENT DOCUMENTS

2016/0135362 A1    5/2016   Connors et al.
2016/0242352 A1    8/2016   Hussherr et al.

OTHER PUBLICATIONS

Bernard Tobin, Planter Modification Can Fix Neonic Problem, says University of Guelph Researcher, Real Agriculture, Jul. 4, 2016.
Monosem Inc., Bee Colony Health and Insecticide Dust Reduction, Jan. 16, 2014.
Dan Charles, 2 Scientists, 2 Different Approaches to Saving Bees From Poison Dust, The Salt: NPR, May 27, 2017.
ISO 17962:2015, Agricultural Machinery—Equipment for Sowing—Minimization of the Environmental Effect of Fan Exhaust From Pneumatic Systems, Jul. 2015.
Bayer Crop Science, Stewardship at Bayer SeedGrowth: SweepAir—tackling dust more efficiently, YouTube.com, Sep. 24, 2015.
Monosem Inc., Seed Planter Photo, undated admitted prior art.
Unknown Manufacturer, Seed Planter Photo, undated admitted prior art.
Great Plains Manufacturing Inc, Great Plains Planters Comply With Pollinator Protection, Bee Friendly Yield-Pro Planters, http:www.greatplainsag.com/en/news/9213/great-plains-planters-comply-pollinator-protection, Apr. 16, 2014.

\* cited by examiner

EXHAUST SYSTEM FOR AIR PRESSURE SUPPLY SYSTEM OF WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, such as planters and seeders, and, more particularly, relates to an exhaust system for an air pressure supply system of a work vehicle.

BACKGROUND OF THE DISCLOSURE

Work vehicles, such as air seeders and other seeding devices, are configured for applying seed, fertilizer, and/or other particulate commodities to a field. The work vehicle may also include ground engaging implements, such as opener discs, closer discs, and/or other implements for applying the commodity into the soil.

Work vehicles typically include one or more tanks and a metering system that meters out a predetermined quantity of the commodity from the tank as the work vehicle moves across the field. The metering system may be connected to an air pressure system with a blower or fan for moving the commodity through the metering system.

SUMMARY OF THE DISCLOSURE

This disclosure provides an improved exhaust system for a vacuum device of a work vehicle.

In one aspect, the disclosure provides a work vehicle that includes a frame structure and a plurality of row units. The row units respectively include a ground system with at least one opener implement and at least one closing implement. The opener implement is configured to create an opening in the ground as the work vehicle travels across a field. The closing implement is configured to close the opening as the work vehicle travels across the field. The row units also include a metering system with a metering element configured to singulate a commodity and meter out the commodity from the metering system. The row units further include a commodity delivery system configured to receive the commodity metered out from the metering system and deliver the commodity into the opening before the closing implement closes the opening. Furthermore, the work vehicle includes an air pressure device configured to generate an air pressure differential across the metering element to retain the commodity against the metering element of at least one of the row units to singulate the commodity. The air pressure device includes an exhaust structure with a passage configured to direct exhaust substantially toward the opening before the closing implement closes the opening as the row unit travels across the ground material.

In another aspect, a method of operating a singulating metering system of a work vehicle is disclosed. The method includes forming a ground opening with an opener implement of the work vehicle while moving the work vehicle across a field. The method further includes generating, with an air pressure device, an air pressure differential within the metering system to move a commodity relative to a metering element of the metering system. Moreover, the method includes metering out the commodity using the metering system and delivering the metered commodity to a commodity delivery system for delivery into the ground opening before a closing implement of the work vehicle closes the opening and buries the metered commodity as the work vehicle moves across the field. Additionally, the method includes exhausting an exhaust from the air pressure device via an exhaust structure toward the opening before the closing implement closes the opening as the work vehicle moves across the field.

Furthermore, a work vehicle is disclosed that includes a frame structure and a plurality of row units. The row units include a row unit support structure attached to the frame structure. The row units also include a metering system that is supported by the row unit support structure. The metering system includes a metering element configured to singulate a commodity and meter out the commodity from the metering system. Additionally, the row units include a ground system with at least one opener and at least one closer that are supported by the row unit support structure. The opener is configured to open a furrow as the row unit travels, and the closer is configured to close the furrow as the row unit travels. Moreover, the row unit includes a commodity delivery system configured to receive the commodity metered out from the metering system and deliver the commodity into the furrow as the row unit travels. Also, the row unit includes a vacuum device configured to generate suction for retaining the commodity against the metering element to singulate the commodity. The vacuum device includes an exhaust tube that extends from a housing of the vacuum device and that is attached to the row unit support structure. The exhaust tube includes an end that is proximate the opener. The exhaust tube is configured to direct exhaust from the vacuum device to the furrow before the at least one closer closes the furrow.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of a seed metering system for a seeding machine, such as an air cart, its seeding system, control system(s), and the methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed work vehicle, as shown in the accompanying figures of the drawings described briefly above. Generally, the disclosed work vehicle includes a frame structure and a plurality of row units that are attached to the frame structure. The row units may include respective ground-engaging implements that move the soil, create a furrow, and/or close a furrow as the work vehicle moves across a field. The row units may also include a respective metering system. The metering system may include a metering element, such as a metering disc, that is configured to meter out a predetermined amount of commodity (e.g., singulate particles of the commodity) for delivery to the soil from the respective row unit.

Furthermore, the row units of the work vehicle may include a respective air pressure device, such as a fan, that generates an air pressure differential for operation of the metering system. More specifically, in some embodiments, the air pressure device may be a vacuum device that generates suction force for retaining individual particles of the commodity (e.g., individual seeds) against the moving metering element, allowing individual particles of the commodity to be singulated from the bulk supply. Accordingly, the singulated particles may be dispensed and delivered to the soil at a controlled rate as the work vehicle moves across the field.

The vacuum devices may be relatively small, compact, and low-capacity because they are configured for individual row units. Overall, the noise produced during operation of the work vehicle may be reduced. This may also reduce manufacturing costs. Likewise, the work vehicle may include less hosing, ducting, etc., resulting in saved space and fewer parts for the work vehicle.

Furthermore, the vacuum device may include an exhaust system. The exhaust system may include an elongate structure (e.g., a tube or pipe) that is routed along and attached to the support structure of the row unit. Air, dust, and/or other exhaust substances may be directed from the vacuum device to the ground. The elongate structure may include a terminal end from where the exhaust is ejected toward the ground. The terminal end may be positioned relative to the ground-engaging implements. For example, in some embodiments, the terminal end may be positioned to direct the exhaust into the furrow as the row unit travels across the ground. Then, substances in the exhaust may be buried as the furrow is closed by the ground engaging implements as the work vehicle moves across the field.

Accordingly, the exhaust system of the present disclosure advantageously directs the exhaust toward the ground. Also, the exhaust substances may be buried within the soil as the work vehicle plants the commodity.

Figure 1:
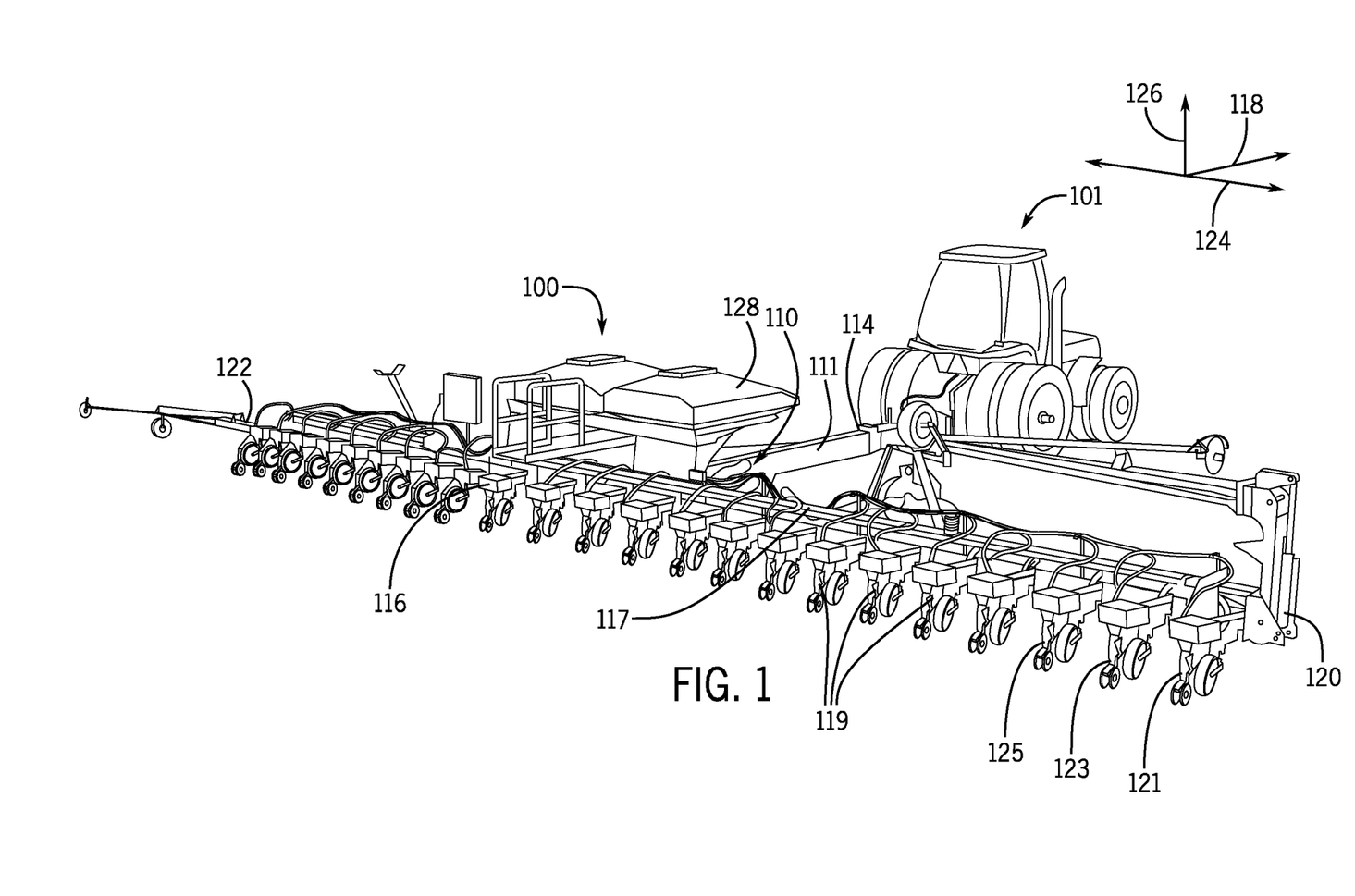
FIG. 1 is a rear perspective view of a towing work vehicle and a towed work vehicle with a plurality of row units according to example embodiments of the present disclosure.

FIG. 1 illustrates a work vehicle 100 according to example embodiments of the present disclosure. The work vehicle 100 may be towed by another vehicle, such as a tractor 101. Thus, the work vehicle 100 may be a towed work vehicle. In other embodiments, the work vehicle 100 of the present disclosure may be a self-propelled vehicle. In some embodiments, the work vehicle 100 may be a planter or seeder configured for agricultural work. It will be appreciated that the illustrated work vehicle 100 is an example embodiment. One or more features of the present disclosure may be included on a different work vehicle without departing from the scope of the present disclosure.

The work vehicle 100 includes a front end 114 and a rear end 116. The work vehicle 100 also includes a first side 120 and a second side 122. A fore-aft axis 118, extending between the rear end 116 and the front end 114, is indicated in FIG. 1 for reference purposes. It will be appreciated that a travelling direction of the work vehicle 100 extends along the axis 118 from the rear end 116 toward the front end 114. A lateral axis 124 is also indicated in FIG. 1, and it will be appreciated that a lateral direction of the work vehicle 100 (extending between the first side 120 and the second side 122) is parallel to the lateral axis 124. Furthermore, a vertical axis 126 is indicated in FIG. 1 for reference purposes.

Generally, the work vehicle 100 may include a frame structure 110 (i.e., a chassis). The frame structure 110 may include an elongate tongue 111. The tongue 111 may be a rigid or telescoping beam that extends along the fore-aft axis 118. The tongue 111 may include a towing package for hitching and unhitching from the tractor 101. The frame structure 110 may further include a lateral beam 117. The lateral beam 117 may be a rigid member that extends along the lateral axis 124. The lateral beam 117 may be fixed to the tongue 111 of the frame structure, proximate the rear end 116 of the work vehicle 100.

The work vehicle 100 may further include a plurality of row units 119. The row units 119 may be attached to the lateral beam 117 of the frame structure 110. The row units 119 may branch from and extend rearward from the lateral beam 117 to define much of the rear end 116 of the work vehicle 100. The plurality of row units 119 may be substantially similar to each other and may include a first row unit 121, a second row unit 123, a third row unit 125, and so on, across the rear end 116 along the lateral axis 124.

The row units 119 may include a number of features that provide various advantages. These features will be discussed with reference to FIG. 2, which illustrates the first row unit 121. The first row unit 121 may be a representative example of the second row unit 123, the third row unit 125, and/or another of the plurality of row units 119.

Figure 2:
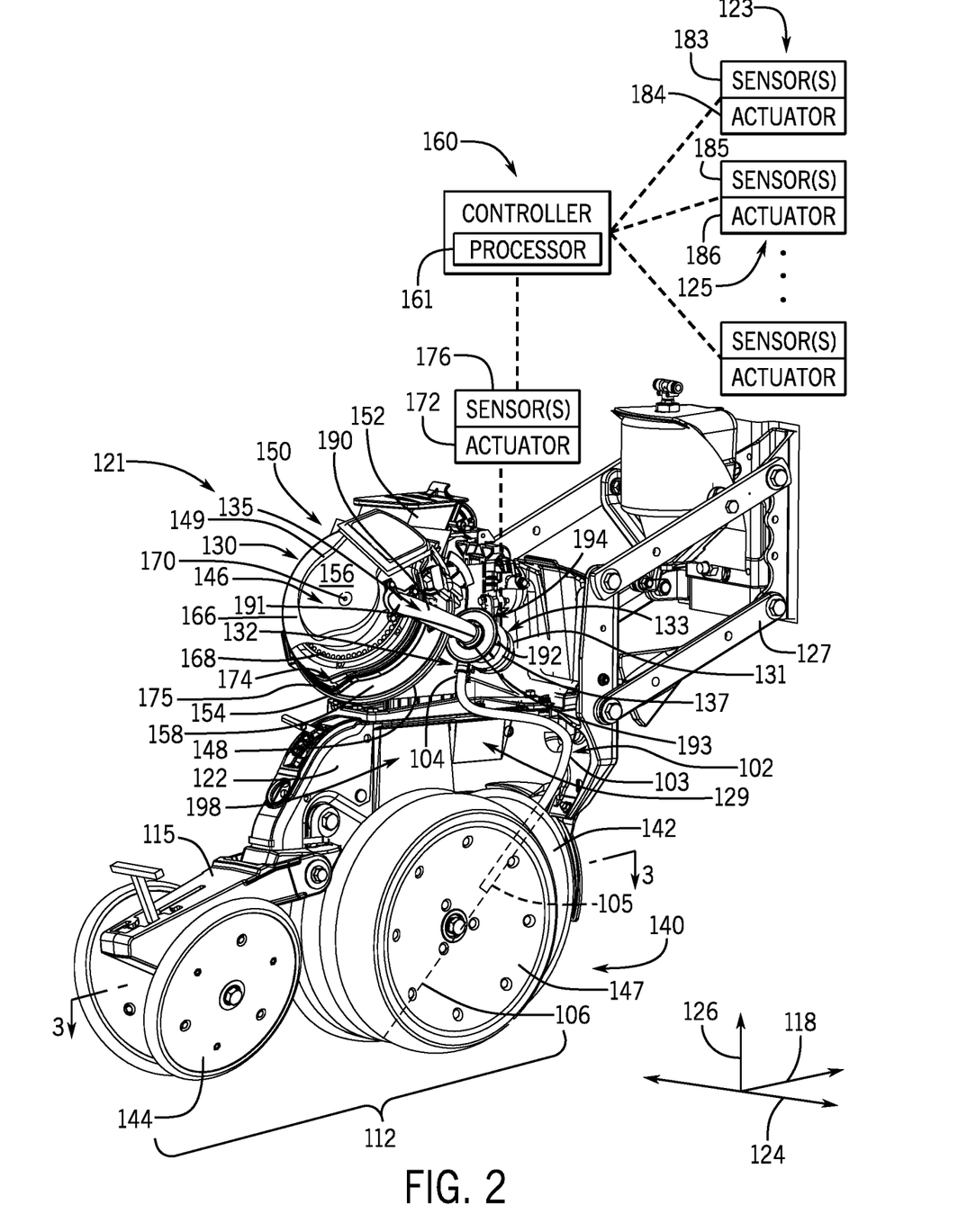
FIG. 2 is a perspective view of a row unit of the work vehicle of FIG. 1, wherein the row unit includes an air pressure exhaust system according to example embodiments of the present disclosure.

As shown, the first row unit 121 may include a support structure 129. The support structure 129 may include a plurality of strong, frame-like pieces, brackets, linkages, etc. The support structure 129 may be attached to the frame structure 110. For example, the support structure 129 may be moveably attached to the lateral beam 117 via a linkage 127, which allows movement of the support structure 129 along the vertical axis 126 relative to the frame structure 110. The support structure 129 may also include a forward member 122 and a rear member 115. The forward member 122 may be disposed between the linkage 127 and the rear member 115 with respect to the fore-aft axis 118. In some embodiments, the rear member 115 may be pivotally attached to the forward member 122 for rotation about an axis that is parallel to the lateral axis 124.

The first row unit 121 may also include a ground system 112. The ground system 112 may include plurality of gauge wheels 147 that are rotationally attached to the forward member 122 to support the support structure 129 above the soil. The ground system 112 may also include ground engaging implements 140 (FIGS. 2-5). The ground engaging implements 140 may be attached (e.g., rotationally attached) to the support structure 129 and may extend downward therefrom. The ground engaging implements 140 may be configured for moving and arranging soil as the work vehicle 100 moves across the field. In other words, the ground engaging implements 140 may arrange a portion of ground material (e.g., soil) into a "ground arrangement". For example, the ground engaging implements 140 may be configured for opening and/or closing a furrow (i.e., a trench, a channel, a pocket, or another opening) in the soil.

Figure 3:
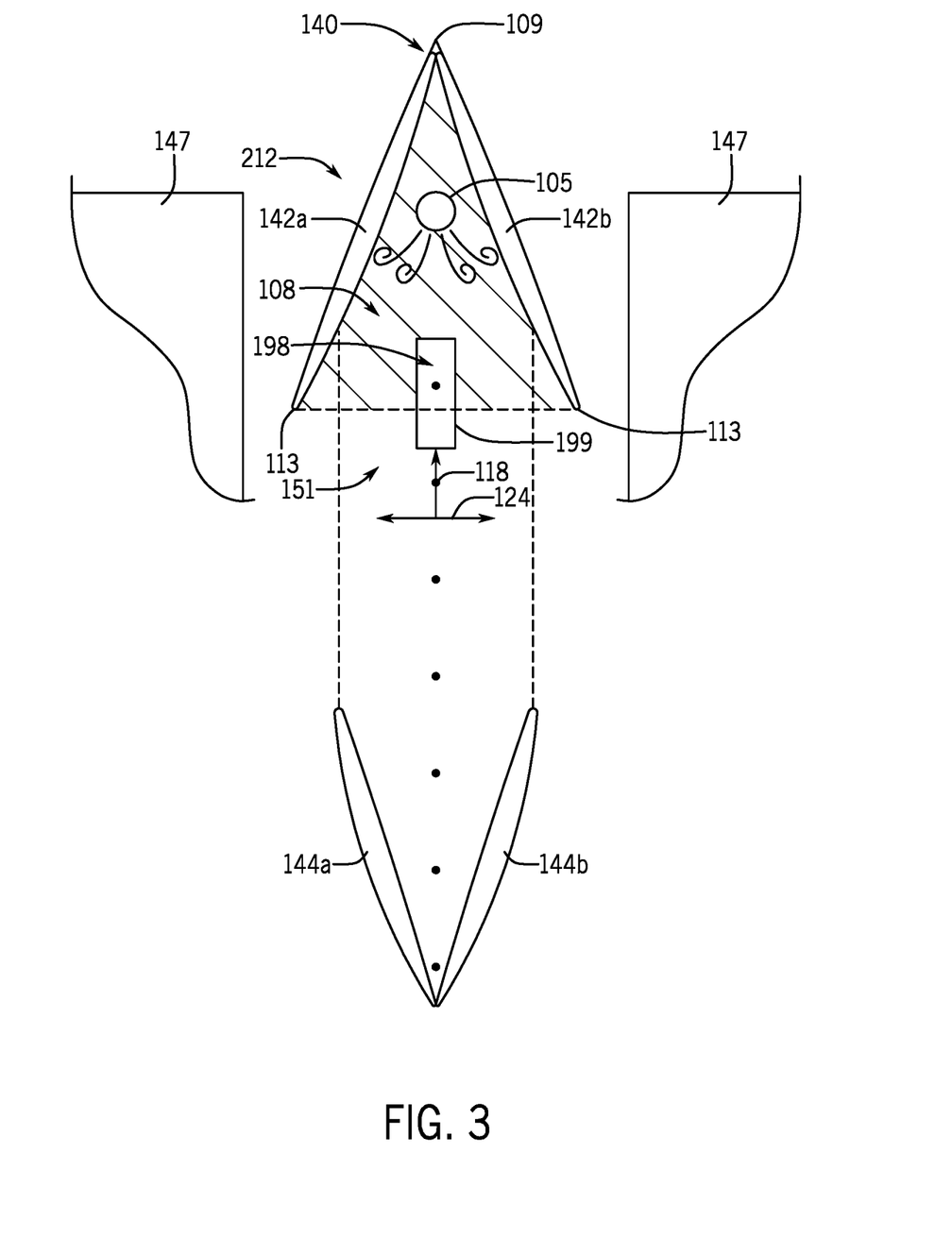
FIG. 3 is a top schematic view of the ground engaging implements of the row unit taken along the line 3-3 of FIG. 2 according to example embodiments.
Figure 4:
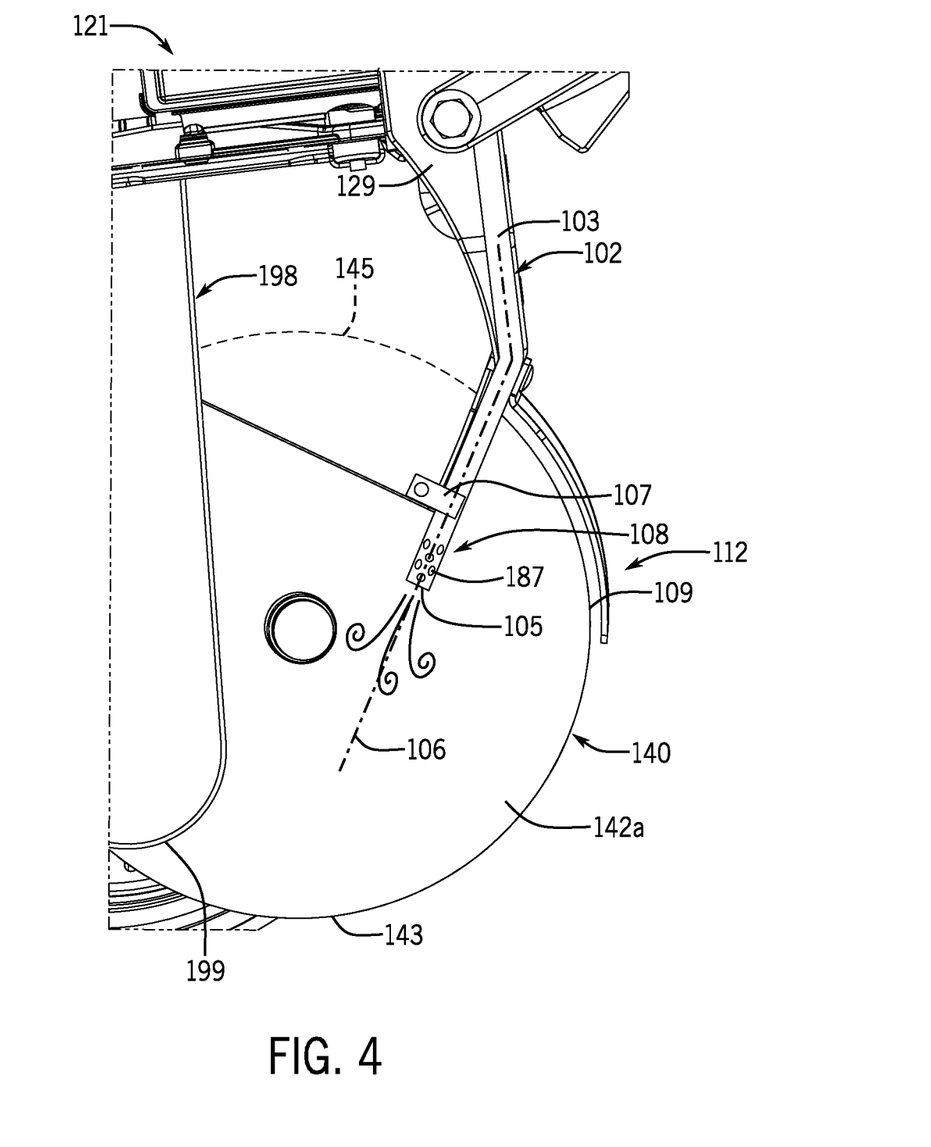
FIG. 4 is a side view of the exhaust system of FIG. 2 according to example embodiments of the present disclosure.
Figure 5:
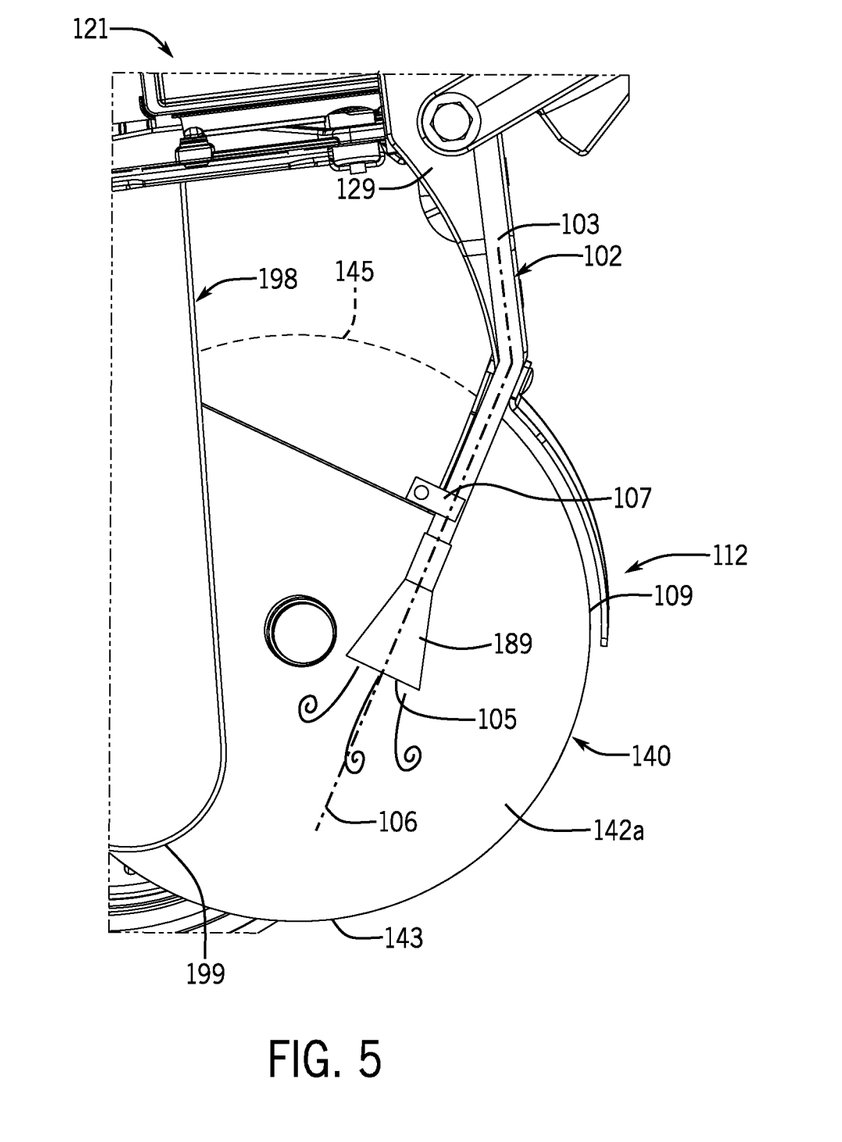
FIG. 5 is a side view of the exhaust system of FIG. 2 according to additional example embodiments of the present disclosure.

In some embodiments, the ground engaging implements 140 may include a plurality of opener discs 142 and a plurality of closing wheels 144. As shown in FIG. 3, there may be two opener discs 142a, 142b arranged side-by-side on opposite sides of the fore-aft axis 118 between the gauge wheels 147. In FIGS. 4 and 5, one opener disc 142b is omitted to show a space 108 therebetween. The space 108 is indicated in FIG. 3 with hatching and is defined axially from a forward end 109 of the opener discs 142a, 142b to a rearward end 113. The opener discs 142 may be canted toward each other at an angle relative to the fore-aft axis 118. Accordingly, the opener discs 142 may be configured for opening a furrow 151 (FIG. 3) in the earth as the work vehicle 100 travels. The work vehicle 100 may also include two closing wheels 144a, 144b that are arranged side-by-side on opposite sides of the fore-aft axis 118. The closing wheels 144a, 144b may be canted relative to the fore-aft axis 118 and in an opposite direction from the opener discs 142a, 142b. The closing wheels 144 may be attached to the rear member of the support structure 129. Accordingly, the closing wheels 144a, 144b may be configured for closing the furrow 151 in the earth as the work vehicle 100 travels across the field. As will be discussed, the row unit 121 also includes features configured to deliver commodity into the open furrow 151 before the closing wheels 144 close the furrow 151.

Moreover, the first row unit 121 may include a commodity system 150. The commodity system 150 may be configured to provide a commodity to the soil (e.g., into the furrow 151) as the work vehicle 100 moves across the terrain.

As shown in FIG. 2, the commodity system 150 may include a reservoir 152. The reservoir 152 may be in communication with a tank 128 (FIG. 1) of the work vehicle 100, which contains seed, fertilizer, and/or another granular commodity. The commodity within the tank 128 may be delivered (e.g., via a hose) to the reservoir 152 of the row unit 121 for distribution to the soil as will be discussed.

The commodity system 150 of the row unit 121 may also include a metering system 130. The metering system 130 may be a singulating metering system in some embodiments. The metering system 130 may operate to meter out the commodity from the reservoir 152 at a controlled rate as the vehicle 100 moves across the field. The metering system 130 may also move the metered commodity to a commodity delivery system 198. The commodity delivery system 198 may be a gravity drop seed tube, a mechanical conveyor, a pneumatic conveyor, or the like. As shown, the commodity delivery system 198 may include a hollow structure that extends downward toward the ground from the meter housing 146. An open, lower end 199 of the commodity delivery system 198 may be disposed rearward of the opener discs 142a, 142b with respect to the fore-aft axis 118 (FIGS. 3-5). The lower end 199 may also be disposed between the opener discs 142a, 142b with respect to the lateral axis 124. Furthermore, the lower end may be disposed between the closing wheels 144a, 144b with respect to the fore-aft axis 118 and between the closing wheels 144a, 144b with respect to the lateral axis 124. Accordingly, the delivery system 198 may deliver the particles of commodity into the furrow 151, which has been opened by the opener discs 142a, 142b before the closing wheels 144a, 144b close the furrow 151 and bury the deposited commodity in the ground.

As shown in FIG. 2, the metering system 130 may include a meter housing 146. The meter housing 146 may be in communication with the reservoir 152 and may receive a bulk supply of the commodity therefrom. The meter housing 146 may comprise a housing member 148 and a cover 149. The housing member 148 may be fixed to the forward member 122 of the support structure 129 of the row unit 121. The cover 149 may be removably attached to the housing member 148. In some embodiments, the cover 149 may be attached to the housing member 148 via a hinge, and the cover 149 may be held closed by a latch. The cover 149 may be selectively unlatched and pivoted open via the hinge to access the interior of the meter housing 146. Conversely, the cover 149 may be pivoted closed and latched to secure the cover 149 in place during operation.

The housing member 148 may be rounded and may include a peripheral lip 154 that faces rearward from the row unit 121. The cover 149 may be thin-walled, hollow, and three-dimensionally contoured. The cover 149 may include an enlarged cover plate 156 and a side wall 158 that projects from the cover plate 156. When the cover 149 is attached to the housing member 148, the side wall 158 of the cover 149 may align with and mate with the peripheral lip 154 of the housing member 148. Accordingly, the cover 149 and the housing member 148 may cooperate to define an interior of the meter housing 146. The metering system 130 may additionally include a metering element 166 (shown in phantom in FIG. 2). The metering element 166 may be a relatively flat and rounded disc or wheel. The metering element 166 may include a series of holes 168 that are aligned circumferentially about its periphery. The metering element 166 may be disposed within the interior of the meter housing 146. The metering element 166 may be supported for rotation relative to the housing member 148 by a shaft 170. Accordingly, the metering element 166 may rotate about the axis of the shaft 170 relative to the housing member 148. Also, in some embodiments, there may be an actuator (e.g., an electric motor) that drives and rotates the metering element 166 relative to the housing member 148.

When the cover 149 is closed and attached to the housing member 148 (FIG. 2), the cover 149 and the housing member 148 may cooperatively enclose the metering element 166 within the interior 162 of the meter housing 146. The rear side of the metering element 166 may face the cover 149. An opposing front side of the metering element 166 may face the housing member 148 and commodity may be received from the reservoir 152 in the space therebetween. The space may also be open to the commodity delivery system 198. The metering element 166 may rotate about the axis of the shaft 170 relative to the housing member 148 and meter out particles of the commodity into the commodity delivery system 198.

Furthermore, the commodity system 150 of the first row unit 121 may include a pressure supply system 132. The pressure supply system 132 may include an air pressure device 133, and, in some embodiments, the air pressure device 133 may be a vacuum device 131 configured for providing negative air pressure (i.e., suction) to the meter housing 146, allowing the metering system 130 to meter out particles of the commodity. However, in other embodiments, the pressure supply system 132 may be configured for providing positive air pressure (i.e., blowing air) to the metering system 130 for the same purposes. In some embodiments, aspects of the pressure supply system 132 may be configured according to the disclosure of patent application Ser. No. 15/874,171, filed Jan. 18, 2018, entitled "Pressure Supply System for Commodity Meter of Work Vehicle", the entire disclosure of which is hereby incorporated by reference. Thus, in the illustrated embodiments, each row unit 119 may include a respective vacuum device 131 for providing suction to the metering system 130 of the particular row unit 119. However, in other embodiments, there may be a single vacuum device 131 that provides suction to multiple metering systems 130 of different row units 119. Likewise, there may be a single blower that provides positive pressure to multiple metering systems 130 without departing from the scope of the present disclosure.

As shown in FIG. 2, the vacuum device 131 may include a vacuum housing 137 and a moveable member, such as a blower or fan that is enclosed within the vacuum housing 137. The vacuum housing 137 may be fixed to the forward member 122 of the support structure 129 of the row unit 121.

The vacuum housing 137 may be hollow and may have a volute shape in some embodiments. The fan within the vacuum housing 137 may have a plurality of blades and may be rotatably supported within the vacuum housing 137. The fan may be driven in rotation relative to the vacuum housing 137 by a fan actuator 172. In some embodiments, the fan actuator 172 may be an electric motor that converts electrical power to mechanical energy to rotate the fan within the vacuum housing 137. The fan actuator 172 may be supported on the forward member 122 of the support structure 129 of the row unit 121.

As shown in FIG. 2, the pressure supply system 132 may further include a fluid connector 135 that fluidly connects the vacuum device 131 and the metering system 130. In some embodiments, the fluid connector 135 is a pipe with a passage that fluidly connects the interior 162 of the meter housing 146 and the interior of the vacuum housing 137.

In some embodiments, the fluid connector 135 may include a first member 190. The first member 190 may be a rigid section of pipe that is fixed on one end to the cover of the meter housing 146 and that terminates at an opposing free end 191. In some embodiments, the first member 190 may be attached to one peripheral side of the cover plate 156, and the first member 190 may extend in a non-linear direction therefrom. For example, the first member 190 may extend laterally from the cover plate 156 and may curve forward. Also, the first member 190 may be integrally connected to the cover 149 so as to cooperatively define a unitary, one-piece member.

The fluid connector 135 may also include a second member 192. The second member 192 may be a relatively short segment of rigid pipe that is fixed on one end to the vacuum housing 137, extends generally rearward, and that terminates at an opposing free end 193. The axis of the second member 192 may be generally aligned with the axis of rotation of the fan 139.

The first member 190 and the second member 192 may removably attach at a joint 194. More specifically, as shown in FIG. 2, the end 191 of the first member 190 may attach to the end 193 of the second member 192 to define the joint 194. Also, in some embodiments, the joint 194 may include one or more sealing members for fluidly connecting the first member 190 and the second member 192 and substantially sealing the passage extending through the fluid connector 135. For example, the end 191 of the first member 190 may include a first sealing member 196, and the end 193 of the second member 192 may include a second sealing member 197. The first sealing member 196 may include a flexible flange that projects outward radially from the axis of the end 191 of the first member 190. The second sealing member 197 may be bell-shaped with an annular and convexly curved surface. The first sealing member 196 (the male sealing member) may be received in the second sealing member 197 (the female sealing member). It will be appreciated that the positions of the first and second sealing members 196, 197 may be reversed (with the first sealing member 196 attached to the second member 192 and the second sealing member 197 attached to the first member 190) without departing from the scope of the present disclosure.

When the cover 149 is attached to the housing member 148 of the meter housing 146, the flange of the first sealing member 196 may be received within and may substantially seal against the convexly curved surface of the second sealing member 197, thereby defining a continuous fluid passage through the fluid connector 135 from the meter housing 146 to the vacuum housing 137.

In this position, the rotating fan 139 may provide a suction force (via the fluid connector 135) to the interior 162 of the meter housing 146. More specifically, the fan 139 may suck air through the holes 168 in the metering element 166, causing a pressure differential across the metering element. Individual particles of the commodity from the reservoir 152 may be sucked into the holes 168 and retained there as the metering element 166 rotates about the axis of the shaft 170. The individual particles may be released in succession from the metering element 166 and delivered to the commodity delivery system 198 for delivery to the soil.

As stated above, it may be necessary to open the cover 149 of the meter housing 146, for example, to service the metering element 166, to replace the metering element 166, etc. As the cover 149 is opened, the first sealing member 196 may automatically unseal and move away from the second sealing member 197. After servicing the metering element 166 and the cover 149 is closed, the first member 190 may align with the second member 192, allowing the first sealing member 196 to re-seal against the second sealing member 197. Accordingly, the cover 149 of the meter housing 146 may be quickly and conveniently opened and closed, without having to manipulate the vacuum device 131.

The metering system 130 may also include a number of additional features that provide other advantages. For example, the metering system 130 may include a collector structure 174 that is supported by the meter housing 146. In some embodiments, the collector structure 174 may be a hollow projection that extends downward from a lower area of the cover 149. In some embodiments, the collector structure 174 may be disposed on a lower peripheral area of the cover 149, between hinge 163 and the first member 190 of the fluid connector 135. Accordingly, during operation of the commodity system 150, debris or other substances may fall due to gravity into the collector structure 174 before being sucked into the fluid connector 135 and the vacuum housing 137. Thus, the fan 139 is unlikely to be damaged by such debris. In some embodiments, the collector structure 174 may include a clean-out valve 175 for removing the debris within the collector structure 174. The clean-out valve 175 may be manually opened in some embodiments. In other embodiments, the clean-out valve 175 may be biased closed, for example, due to the suction force provided by the fan 139, and once the suction force is reduced, the clean-out valve 175 may automatically open to release the debris collected in the collector structure 174. In additional embodiments, the clean-out valve 175 may automatically open under the weight of the debris.

In addition, the vacuum device 131 may include an exhaust system 102. As shown in FIGS. 2, 4, and 5, the exhaust system 102 may include an exhaust structure, such as an elongate tube 103 (i.e., pipe, hollow rod, line, etc.). The tube 103 may be made of rigid material (e.g., metal) or resilient material (e.g., polymer). The tube 103 may have a first end 104 that is attached to the vacuum housing 137. The tube 103 may have an opposing second end 105 that terminates proximate the ground. The tube 103 may have a nonlinear axis 106, and the tube 103 may generally extend downward from the vacuum housing 137 toward the ground. The tube 103 may be hollow and may have a substantially continuous passage extending from the interior of the vacuum housing 137 to the second end 105. Accordingly, exhaust air and any dust, debris, or other substances within the exhaust air may be directed from the vacuum housing 137 to the ground in a controlled manner.

As shown in FIGS. 2 and 4, the tube 103 may be attached and supported on the support structure 129 of the row unit 121. As shown in FIG. 4, there may a plurality of fasteners 107 (e.g., clips, clamps, snap-on retainers, etc.) that attach the tube 103 to the support structure 129. Also, the fasteners 107 may be spaced apart along the axis 106 such that the tube 103 is supported along its length between the first end 104 and the second end 105 by the support structure 129. As shown in FIG. 2, the tube 103 may extend downward from the vacuum housing 137, curve forward, then back downward toward the ground, and terminate at the second end 105. Also, as shown in FIG. 4, the second end 105 may be directed slightly rearward.

In some embodiments, the second end 105 may be disposed within the space 108 between the opener discs 142*a*, 142*b*. For example, as shown in FIG. 3, the second end 105 may be disposed laterally between the opener discs 142*a*, 142*b*. The second end 105 may be disposed between the forward end 109 and the rearward end 113 of both opener discs 142*a*, 142*b*. Also, as shown in FIG. 4, the second end 105 may be elevated in the space 108, above the bottom edges 143 and below the top edges 145 of the opener discs 142*a*, 142*b*. Furthermore, as shown in FIG. 3, the second end 105 may be disposed forward of the open end 199 of the commodity delivery system 198 and forward of the closing wheels 144*a*, 144*b* with respect to the fore-aft axis 118.

Accordingly, the opener discs 142*a*, 142*b* may open the furrow 151 as the row unit 121 travels across the soil. The exhaust system 102 may direct exhaust from the vacuum device 131, out the second end 105, and into the furrow 151 during travel. The commodity delivery system 198 may also deliver the singulated commodity into the furrow 151. Then, the closing wheels 144*a*, 144*b* may move the soil back into and close the furrow 151, thereby burying the commodity as well as any substances contained in the exhaust.

In some embodiments, the position and/or orientation of the second end 105 with respect to the opener discs 142*a*, 142*b* may help contain the exhaust and direct it toward the furrow 151. For example, the opener discs 142*a*, 142*b* may act as barriers in the lateral direction and may direct the exhaust toward the furrow 151.

In some embodiments, the second end 105 may include one or more transverse openings 187 (FIG. 4). The transverse openings 187 may be through-holes that extend radially with respect to the axis 106. The transverse openings 187 may be configured to reduce the velocity of the exhaust. Accordingly, any substances within the exhaust are likely to be directed into the furrow 151 and buried.

In additional embodiments, the second end 105 may include a diffuser 189. The diffuser may be flared open such that the second end 105 grows wider before terminating. The diffuser 189 may be configured to reduce the velocity of the exhaust. Accordingly, any substances within the exhaust are likely to be directed into the furrow 151 and buried.

In addition, the work vehicle 100 may include a control system 160. The control system 160 may be configured for controlling the metering system 130 and/or the pressure supply system 132. Furthermore, in some embodiments, control system 160 may communicate with and independently control the metering system 130 and/or pressure supply system 132 of different row units 119 of the work vehicle 100.

The control system 160 is shown in FIG. 2 according to example embodiments. It will be understood that FIG. 2 is a simplified representation of the control system 160 for purposes of explanation and ease of description, and FIG. 2 is not intended to limit the application or scope of the subject matter in any way. Practical embodiments of the control system 160 may vary from the illustrated embodiment without departing from the scope of the present disclosure. Also, the control system 160 may include numerous other devices and components for providing additional functions and features, as will be appreciated in the art.

The control system 160 may be wholly supported on the work vehicle 100, or the control system 160 may include components that are remote from the vehicle 100. The control system 160 may be an electronic (e.g., computerized) control system in some embodiments. In other embodiments, the control system 160 may be a hydraulic control system, a pneumatic control system, a combination control system, etc.

The control system 160 may include a processor 161. The processor 161 may comprise hardware, software, and/or firmware components configured to enable communications and/or interaction between sensor(s) of the row unit 121, actuator(s) of the row unit 121, as well as a memory element, a user interface (U/I), etc. The processor 161 may also perform additional tasks and/or functions described in greater detail below. Depending on the embodiment, the processor 161 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 161 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 161 includes processing logic that may be configured to carry out the functions, techniques, and processing tasks associated with the operation of the control system 160. Furthermore, the steps of a method or algorithm described in connection with the embodiments disclosed herein may be embodied directly in hardware, in firmware, in a software module executed by the processor 161, or in any practical combination thereof.

The control system 160 may communicate with the fan actuator 172 for controlling the speed of the fan within the vacuum device 131. More specifically, the control system 160 may output control signals to the fan actuator 172 for changing the speed (RPM) of the fan and, thus, controlling the amount of suction pressure provided to the metering system 130 by the pressure supply system 132.

Moreover, the control system 160 may communicate with at least one sensor 176. In some embodiments, the sensor 176 may be a pressure sensor configured for detecting an air pressure condition associated with the pressure differential provided by the pressure supply system 132. For example, in some embodiments, the sensor 176 may be mounted to the fluid connector 135, to the vacuum housing 137, or another fluid line of the pressure supply system 132 for directly detecting a current pressure within those fluid passages. In another embodiment, the sensor 176 may be configured for detecting the speed (RPMs) of the fan of the vacuum device 131 for indirectly measuring the pressure provided thereby. The sensor 176 may detect one or more of these conditions and communicate the data to the processor 161. The control system 160 may, in turn, control the speed of the fan based at least partly on the condition (i.e., the pressure condition) detected by the sensor 176.

Also, in some embodiments, the sensor 176 may be a metering sensor configured for detecting a commodity condition associated with the commodity metered out by the metering system 130. For example, in some embodiments, the sensor 176 may be supported by the commodity delivery system 198 and may detect particles of commodity as they move therethrough. In some embodiments, the sensor 176 may be a light sensor that detects the particles as they move through the system 198. The sensor 176 may detect the rate at which particles of the commodity are moving through the system 198, may detect the number of particles moving through the system 198, etc. The sensor 176 may communicate this data to the processor 161. The control system 160 may, in turn, control the speed of the fan of the vacuum device 131 based at least partly on the condition (i.e., the commodity condition) detected by the sensor 176. For example, if the sensor 176 detects that the seed count is too low, indicating a large number of "skips," the control system 160 may increase the speed of the fan to increase pressure at the metering system 130. In contrast, if the sensor 176 detects that the seed count is too high, indicating a large number of "multiples," the control system 160 may decrease the speed of the fan to decrease pressure at the metering system 130.

Thus, the control system 160 may control the metering system 130 and the pressure supply system 132 of the first row unit 121. Furthermore, the control system 160 may be used to control other row units 119 of the work vehicle 100 as well. The control system 160 may be configured to control the metering system 130/pressure supply system 132 of one row unit 119 independently of the metering system 130/pressure supply system 132 of another row unit 119. In some embodiments, the control system may independently control each of the metering systems 130 and pressure supply systems 132.

As represented in FIG. 2, the control system 160 may be in communication with at least one sensor 183 and actuator 184 of the second row unit 123 of the work vehicle 100. The sensor 183 may correspond to the sensor(s) 176 of the first row unit 121, and the actuator 184 may correspond to the actuator 172 of the first row unit 121. Accordingly, the sensor 183 may detect an air pressure condition and/or a commodity condition of the second row unit 123 and communicate corresponding data to the processor 161. The control system 160 may, in turn, control the actuator 184 according to this input from the sensor 183 for changing the air pressure in the metering system 130 of the second row unit 123. In some situations, the actuator 184 of the second row unit 123 may be controlled independently and differently than the actuator 172 of the first row unit 121.

Likewise, the control system 160 may be in communication with a sensor 185 and an actuator 186 of the third row unit 125. Thus, the pressure supply system 132 of the third row unit 125 may be controlled independently as well. It will be appreciated that the control system 160 may communicate with sensors/actuators of the other row units 119 of the work vehicle 100 so that these row units 119 may be independently controlled as well.

As such, the control system 160 may independently control the pressure supply systems 132 and meter systems 130 of the different row units 119. This may be useful, for example, for tailoring the pressure of a particular row unit 119 according to its specific calibration data. Also, in some embodiments, the control system 160 may shut off commodity output from a particular row unit 119 simply by reducing the speed of the respective fan to zero while the fans of other row units 119 continue to operate for metering commodity from those row units 119.

Figure 6:
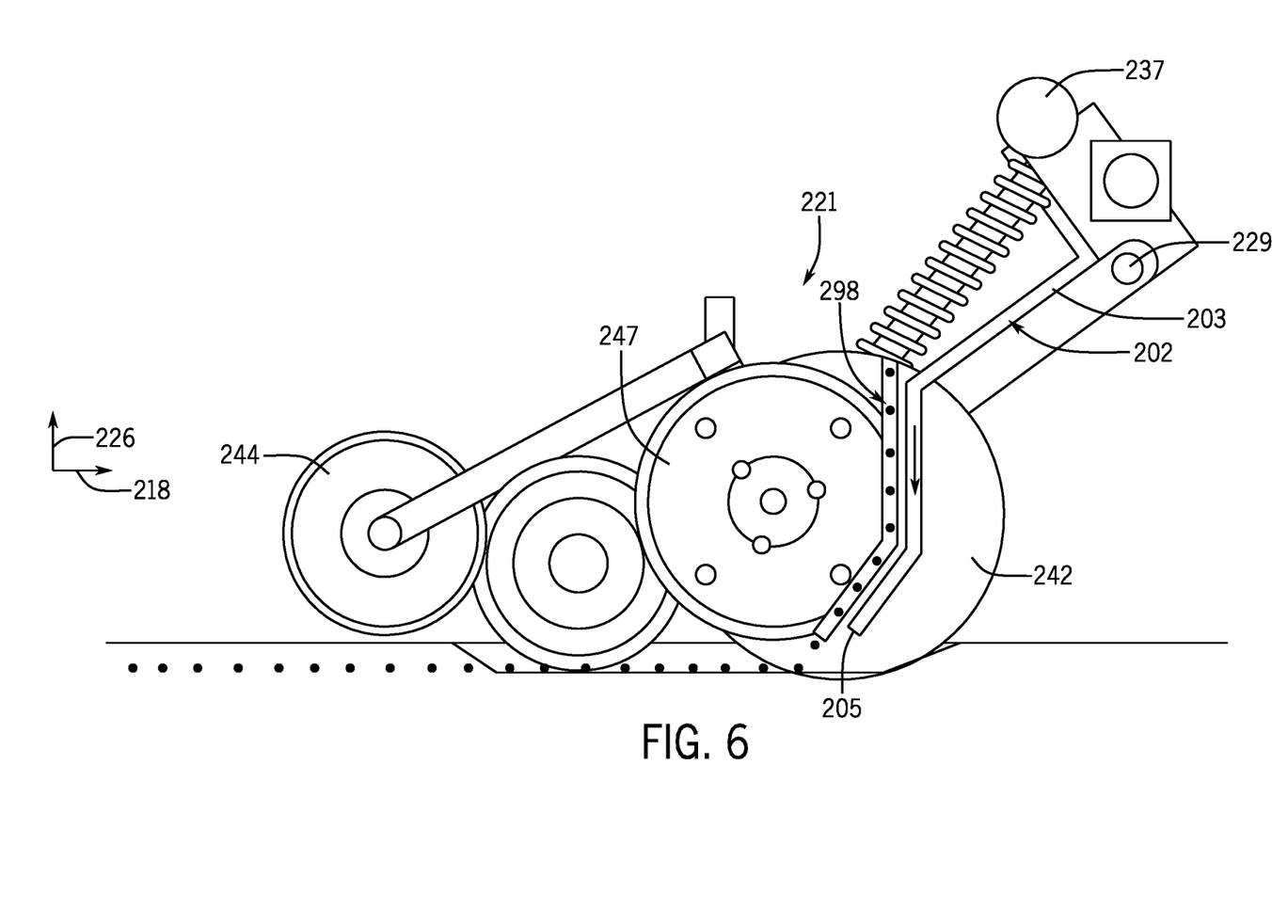
FIG. 6 is a side view of the exhaust system and ground engaging implements according to additional example embodiments of the present disclosure.
Figure 7:
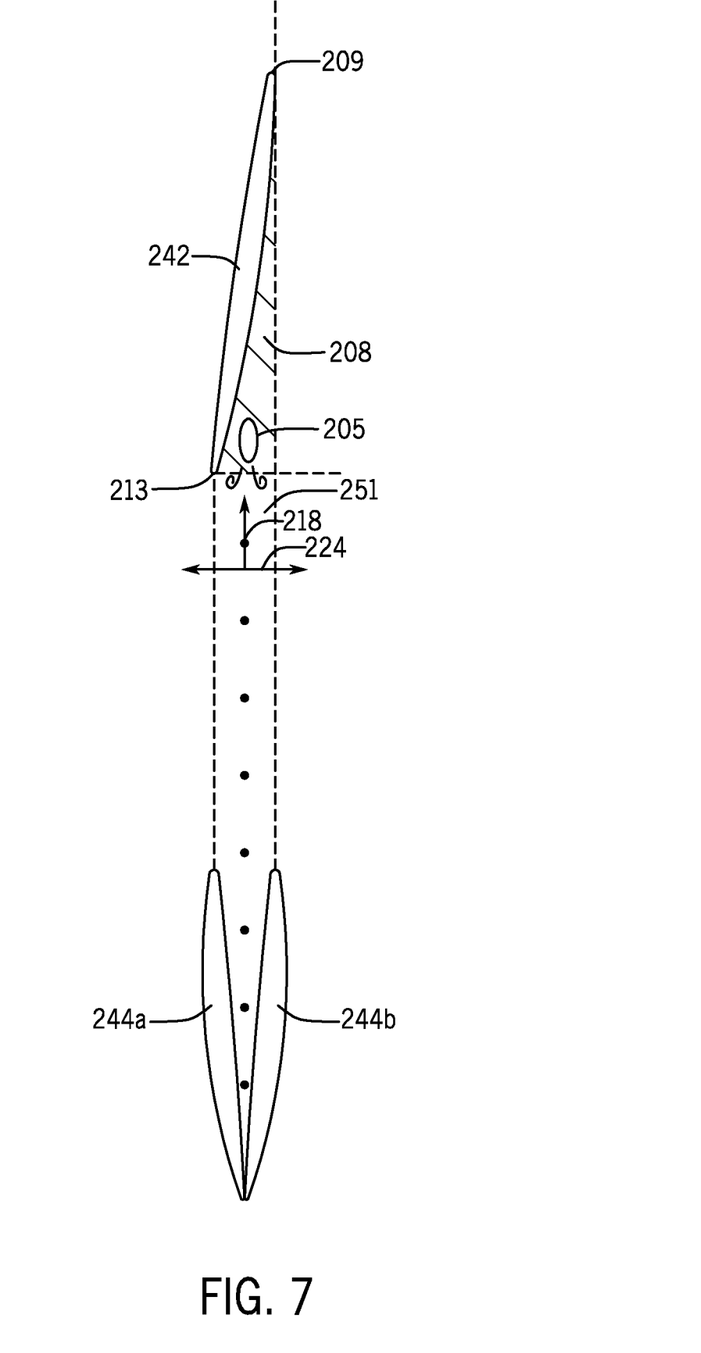
FIG. 7 is a top schematic view of the exhaust system and ground engaging implements of FIG. 6.

Referring now to FIGS. 6 and 7, additional embodiments of the row unit 221 are illustrated. The row unit 221 may include components that correspond to those of FIGS. 1-5 except as noted below. Corresponding components are indicated with corresponding reference numbers increased by 100.

The tube 203 of the exhaust system 202 may extend along the support structure toward the soil as shown in FIG. 6. Also, as shown in FIG. 7, the row unit 221 may include a single opener disc 242 configured for opening the furrow 251. The opener disc 242 may be canted at an angle relative to the fore-aft axis 218. The second end 205 of the tube 203 of the exhaust system 202 may be disposed between the forward end 209 and the rearward end 213 of the opener disc 242 with respect to the fore-aft axis 218. Also, the second end 205 may be disposed between the forward end 209 and the rearward end 213 laterally with respect to the lateral axis 224. Accordingly, the second end 205 may be disposed within the space 208 (i.e., within the so-called "shadow" of the opener disc 242).

Figure 8:
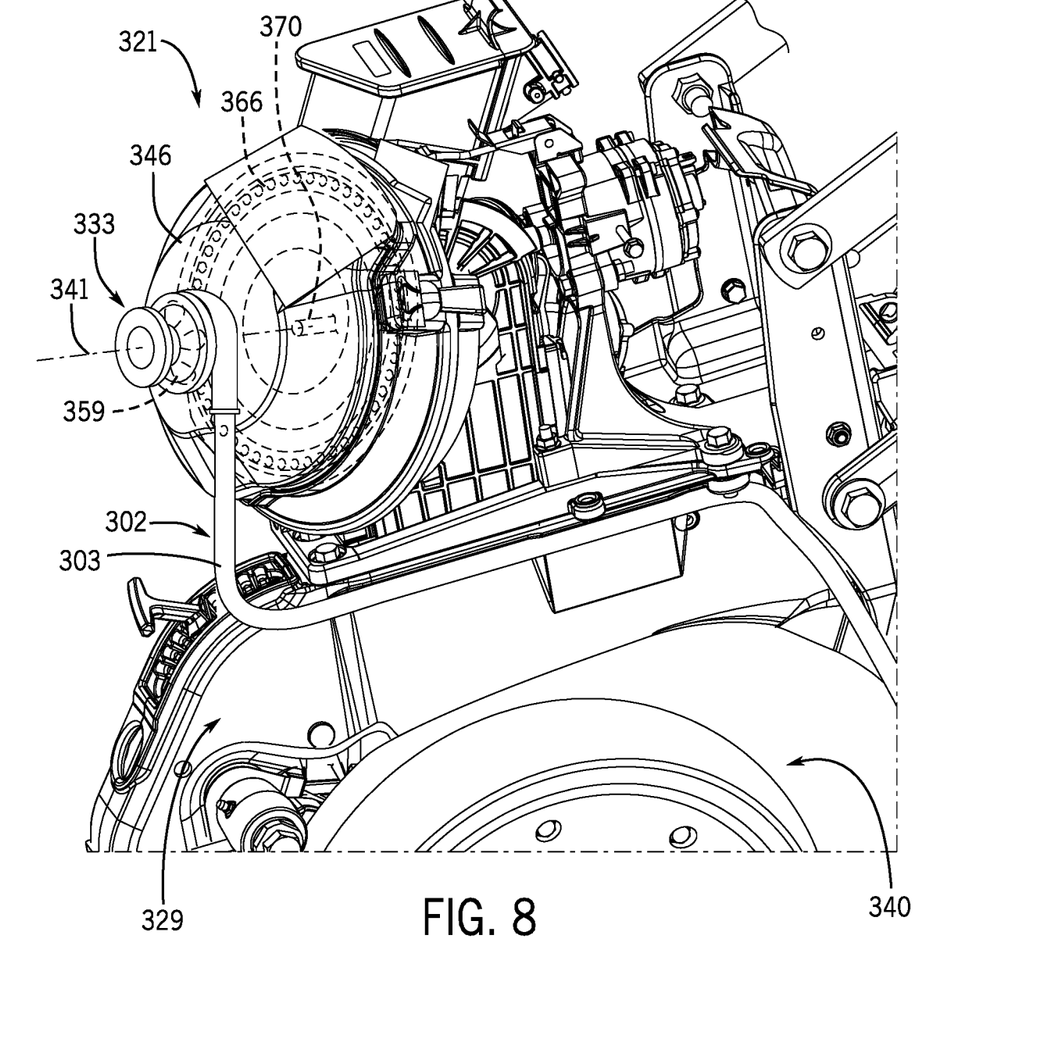
FIG. 8 is a rear perspective view of an exhaust system according to additional example embodiments of the present disclosure.

Referring now to FIG. 8, additional embodiments of the row unit 321 are illustrated. The row unit 321 may include components that correspond to those of FIGS. 1-5 except as noted below. Corresponding components are indicated with corresponding reference numbers increased by 200.

As shown, the vacuum device 331 may be supported by the meter housing 346. The vacuum housing 337 may be attached to the cover 349 of the meter housing 346. In some embodiments, the fan 359 inside the vacuum housing 337 may rotate about an axis 341. As stated above, the meter element 366 may rotate about a shaft 370. In some embodiments, the vacuum housing 337 may be attached to the cover 349 such that the fan 359 and the metering element 366 are substantially coaxial.

The tube 303 of the exhaust system 302 may extend downward from the vacuum housing 337 and may attach to the support structure 329 of the row unit 321. The tube 303 may extend forward and down between the ground engaging implements 340, similar to the embodiments discussed above.

In summary, the work vehicle 100 of the present disclosure includes row units with respective air vacuum devices 131, 231, 331. The vacuum device 131, 231, 331 for the row units may be relatively small, compact, and low-capacity because they are configured for the individual row units. Overall, the noise produced during operation of the work vehicle 100 may be reduced. This may also reduce manufacturing costs. Likewise, the work vehicle 100 may include less hosing, ducting, etc., resulting in saved space and fewer parts for the work vehicle.

Furthermore, the exhaust system 102, 202, 302 of the vacuum device 131, 231, 331 may direct exhaust substances into the furrow to be buried along with the commodity. Accordingly, the exhaust system 102, 202, 302 provides improved control of substances that may be contained within the exhaust.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle comprising:
   a frame structure; and
   a plurality of row units that respectively include:
      a ground system with at least one opener implement and at least one closing implement, the opener implement configured to create a furrow in the ground as the work vehicle travels across a field, the closing implement configured to close the furrow as the work vehicle travels across the field;
      a metering system including a metering element configured to singulate a commodity and meter out the commodity from the metering system;
      a commodity delivery system configured to receive the commodity metered out from the metering system and deliver the commodity through an end opening into the furrow before the closing implement closes the furrow; and
      at least one air pressure device configured to generate an air pressure differential across the metering element to retain the commodity against the metering element of at least one of the plurality of row units to singulate the commodity, the at least one air pressure device including an exhaust structure with a passage and an end opening to direct exhaust into the furrow before the closing implement closes the furrow as the row unit travels across the ground material;
      wherein the end opening of the exhaust structure is at a different location than the end opening of the commodity delivery system, wherein the end opening of the exhaust structure is disposed forward of the at least one closing implement and rearward, at least in part, of the at least one opener implement.

2. The work vehicle of claim 1, wherein the end opening of the exhaust structure is disposed forward of the end opening of the commodity delivery system.

3. The work vehicle of claim 1, wherein the at least one opener implement includes a first opener disk and a second opener disk, wherein a lateral space is defined between the first and second opener disks; and
   wherein the end of the exhaust structure is directed into the lateral space.

4. The work vehicle of claim 1, wherein the work vehicle defines a fore-aft axis;
   wherein the at least one opener implement includes an opener disk with a forward end and a rearward end;
   wherein the end of the exhaust structure is disposed between the forward end and the rearward end of the opener with respect to the fore-aft axis.

5. The work vehicle of claim 1,
   wherein the exhaust structure includes a diffuser proximate the end opening of the exhaust structure.

6. The work vehicle of claim 1, wherein the exhaust structure includes a tube with a nonlinear axis that extends from the air pressure device.

7. The work vehicle of claim 6, wherein the tube is attached to a row unit support structure.

8. The work vehicle of claim 1, wherein the metering system includes a meter housing that houses the metering element;
   wherein the at least one air pressure device includes a vacuum device that is supported by the meter housing;
   wherein the metering element is supported for rotation about an axis relative to the meter housing;

wherein the vacuum device includes a fan that is supported for rotation about the axis; and wherein the fan and the metering element are substantially coaxial.

9. A method of operating a singulating metering system of a work vehicle, the method comprising:

forming a furrow with an opener implement of the work vehicle while moving the work vehicle across a field, the opener implement having at least one opener disk with a forward portion and a rearward portion relative to a fore-aft axis of the work vehicle;

generating, with an air pressure device, an air pressure differential within the metering system to move a commodity relative to a metering element of the metering system;

metering out the commodity using the metering system and delivering the metered commodity to a commodity delivery system for delivery into the furrow before a closing implement of the work vehicle closes the furrow and buries the metered commodity as the work vehicle moves across the field; and exhausting an exhaust from the air pressure device via an exhaust structure toward the furrow into a space defined between the forward and rearward portions of the opener disk, including exhausting a substance in the exhaust into the furrow before delivering the metered commodity to the furrow and before the closing implement closes the furrow as the work vehicle moves across the field.

10. The method of claim 9, wherein the opener implement includes a first opener disk and a second opener disk that define the space into which the exhaust is exhausted.

11. The method of claim 9, wherein exhausting the exhaust includes directing the exhaust to flow along the exhaust structure toward an end of the exhaust structure; and wherein the end includes a diffuser.

12. The method of claim 9, wherein exhausting the exhaust includes directing the exhaust to flow along an exhaust structure toward an end of the exhaust structure, the exhaust structure defining a longitudinal axis; and wherein the exhaust structure includes at least one transverse opening proximate the end, the transverse opening extending transverse to the longitudinal axis.

13. The method of claim 9, wherein exhausting the exhaust includes directing the exhaust to flow along a nonlinear axis of an exhaust tube that is attached to a row unit support structure of the work vehicle.

14. A work vehicle comprising:

a frame structure; and a plurality of row units each including:

a row unit support structure attached to the frame structure;

a metering system that is supported by the row unit support structure, the metering system including a metering element configured to singulate a commodity and meter out the commodity from the metering system;

a ground system with at least one opener, including a first opener disk and a second opener disk with a lateral space therebetween, and at least one closer that are supported by the row unit support structure, the at least one opener configured to open a furrow as the row unit travels, the at least one closer configured to close the furrow as the row unit travels;

a commodity delivery system configured to receive the commodity metered out from the metering system and deliver the commodity through an end opening into the furrow as the row unit travels; and a vacuum device configured to generate suction for retaining the commodity against the metering element to singulate the commodity, the vacuum device including an exhaust tube that extends from a housing of the vacuum device and that is attached to the row unit support structure, the exhaust tube including an end opening that is proximate the opener, the exhaust tube configured to direct exhaust from the vacuum device to the furrow before the at least one closer closes the furrow;

wherein the end opening of the exhaust structure is at a different location than the end opening of the commodity delivery system and within the lateral space.

* * * * *

UNITED STATES PATENT AND TRADEMARK OFFICE
CERTIFICATE OF CORRECTION

PATENT NO. : 10,820,480 B2
APPLICATION NO. : 15/874214
DATED : November 3, 2020
INVENTOR(S) : Cary S. Hubner It is certified that error appears in the above-identified patent and that said Letters Patent is hereby corrected as shown below:

In the Claims

In Column 15, Claim 11, Line 35, delete "along the" and insert -- along with the --, therefor.

In Column 15, Claim 12, Lines 39-40, delete "along an exhaust" and insert -- along with the exhaust --, therefor.

In Column 16, Claim 12, Line 2, delete "proximate the end," and insert -- proximate to the end, --, therefor.

In Column 16, Claim 13, Line 5, delete "along a" and insert -- along with a --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*